United States Patent

Huang

[11] Patent Number: 5,983,651
[45] Date of Patent: Nov. 16, 1999

[54] COMPRESSED AIR DRYER

[76] Inventor: Chin-Fu Huang, No. 44, Hua Chiao St., Huatan Hsiang, Changhua Hsien, Taiwan

[21] Appl. No.: 09/076,909

[22] Filed: May 13, 1998

[51] Int. Cl.$^6$ .............................. F25D 21/06; F25D 17/06
[52] U.S. Cl. .................................. 62/152; 62/93; 62/180; 95/19; 96/402
[58] Field of Search ............................... 62/93, 186, 152, 62/180; 95/290, 19; 96/402

[56] References Cited

U.S. PATENT DOCUMENTS 4,928,498  5/1990  Gossler .................................. 62/152 X
5,794,453  8/1998  Barnwell ................................. 62/93 X

*Primary Examiner*—William Wayner
*Attorney, Agent, or Firm*—Rosenberg, Klein & Lee

[57] ABSTRACT

The present invention relates to a dryer for compressed air. The dryer employs two evaporators disposed in the compressed air pathway. The dryer uses a three-way valve to control the orientation of the compressed air current. A heat-exchanger is included in the cold-producing medium system for avoiding ice blockage of the compressed air outlet. The dryer provides the high-pressure cold-producing medium at a front portion with more potential cooling, so that the evaporators create a lower temperature for drying the compressed air better. A four-way valve is provided to control the two evaporators working alternately, so that the high-temperature cold-producing medium is directed into the iced idle evaporator by a solenoid valve, to melt the ice rapidly and drain it from the system immediately through an automatic drain valve. Two pressure-sensing devices are respectively located on the inlet and outlet of the compressed air pathway, and a temperature-sensing device is located on the cold-producing medium low-pressure return conduit. A microprocessor collects the values detected by all of the sensors to control the three-way valve, four-way valve and the solenoid valve, in a desired time sequence to obtain dryer compressed air.

2 Claims, 6 Drawing Sheets

COMPRESSED AIR DRYER

FIELD OF THE INVENTION

The present invention relates to a dryer for compressed air, and more particularly to a cooling drying apparatus having a low dew-point, in which the compressed air pipeline is not blocked by ice even as the temperature goes below 0° C.

PRIOR ART

In accordance with modern manufacturing, for the sake of lower cost, compressed air is utilized widely for operating and controlling pneumatic tools, for instance relating to special cooling, drying, cleaning, conveying and packing of professional machines, tools for painting, decorating surface instruments and other precision equipment. So, higher quality compressed air has been demanded gradually. But the normally supplied compressed air contains so much vapor as to cause big problems for the user. The conventional cooling dryer on the market, so far, cannot meet the necessity of modern manufacturing.

Referring to FIG. 1, a conventional air cooling dryer is shown, in which the cold-producing medium is pressed out by a cold-producing medium compressor 11, into the condenser 12 to give off heat, then through a filter 13 and a capillary 14 for expanding the cold-producing medium as it enters evaporator 15 to refrigerate and absorb the heat of the compressed air. After making a heat-exchange, the cold-producing medium finally flows back into the compressor 11 for recycling. In this loop, a hot-gas by-passing valve 16 is connected to the high-pressure side of the cold-producing medium compressor 11 to control the evaporating temperature of the low-pressure side, keeping it above 2° C. so as to avoid the compressed air channel from being ice-blocked. Due to formation of ice at 0.4° C., and the fact that the ice is hardly being eliminated by the use of the by-passing valve, the system cannot work smoothly for a desired time period. Finally, the compressed air cannot pass through the blockage, causing the pressure to up greatly, and the evaporator 15 cannot absorb any heat of the compressed air. That results in the cold-producing medium, with evaporating fully, returning to the compressor 11 with some liquid, to cause damage to the compressor. On the other hand, the hot-gas by-passing valve 16, as a controller for steadying the evaporating temperature, can send some high-pressure and high-temperature cold-producing medium into the low-pressure side. With that arrangement, the cooling capability of the cold-producing medium compressor 11 is reduced, the energy dissipation is increased, and a good drying effect cannot be achieved.

Referring to FIG. 2, another air dryer is shown, in which two suction tanks T1 and T2 respectively holding some chemical moisture absorbent, cooperate with a four-way valve 61 connected to the inlet of the compressed air. Two check valves 1 and 2 are connected on the outlet of the suction tanks T1 and T2, respectively, with each having paralleled by-passing fine pipe 62, 63. Wherein, the four-way valve 61 controls suction tanks T1 and T2 alternating working and reducing the absorbed moisture so that the dew-point of the dried air can get to −40° C., while the dryer shown in FIG. 1 gets to −23° C. So, as to the drying effect, the dryer of FIG. 2 is better. But, the reducing process requires a 15% volume of input compressed air for achieving the goal of reducing the absorbed moisture fully. The saturation ratio of the moisture absorbent gradually increases, and therefore the quality of the processed air will be changed. The constant period of alternately working the suction tanks T1 and T2 will adapt to the change of adjusting the air volume used, therefore the dried air quality will be changed greatly. During the generation of the compressed air in the air compressor, an oil mist is created which will be carried by the compressed air entering the suction tanks, so as to stick on the surface of the moisture absorbent, affecting the drying effect and service life of the moisture absorbent. Further, the moisture absorbent in both suction tanks will have to be fully replaced, increasing the production cost. Meanwhile, the abandoned absorbent will pollute the environment. Hence, the above-mentioned two conventional compressed air dryers have some shortcomings as follows:

1. The conventional air cooling dryer has to try to keep the cooling temperature at about 2° C. for avoiding ice-blockage and damage to the cold-producing medium compressor, so that a better quality of dried air is not obtained;
2. For preventing the cooling temperature going too low, a super-cooling control device is attached to the air cooling dryer so that every-dissipation will be increased indirectly;
3. In the absorption dryer, along with the gradual increase of the saturation ratio of the moisture absorbent, the quality of the processed air will be changed;
4. The longer the time period of use, the poorer the effect of the moisture absorbent will be, although it can be reduced afresh in the absorption dryer, so that the absorbent has to be replaced within a certain period, and will thereby inconvenient maintenance, and increased production cost. Meanwhile, the abandoned absorbent will pollute the environment.

OBJECTS AND SUMMARY OF THE INVENTION

1. It is therefore a main object of the present invention to provide a low dew-point dryer without any ice-blocking occurring, event though the evaporating temperature can go below 0° C., to achieve high-quality dried air.

2. It is a next object of the present invention to provide a low dew-point dryer without attaching a supercooling control device, to save energy and to reduce the failure rate.

3. It is a next object of the present invention to provide a low dew-point dryer with two evaporators automatically controlled by a microprocessor to obtain a stable quality of the dried air.

4. It is a next object of the present invention to provide a low dew-point dryer that applies a physical cycle so that the operation can be repeated smoothly many times to obtain a constant drying effect.

5. It is an object of the present invention to provide a low dew-point dryer having operating convenience and maintenance features, and without any special consumable demanded, so it will have a low operating cost.

For achieving these objects, the present invention employs two evaporators build in the compressed air pathway, by means of a three-way valve to control the orientation of the air current. A heat-exchanger is coupled to the cold-producing medium system for accepting cooling from the cold-producing medium and avoiding ice-blocking of the outlet of the compressed air, providing the high-pressure cold-producing medium at the front portion with more potential cooling so that the evaporators create a lower temperature for drying the compressed air better. A four-way valve is used to control the two evaporators, working alternately, so that the high-temperature cold-producing medium is directed into iced idle evaporator by a solenoid valve to melt the ice rapidly and immediately drain it from the system. Two pressure-sensing devices are respectively located on the air inlet and air outlet, and a temperature-sensing device is coupled to the cold-producing medium low-pressure return conduit. A microprocessor collects the values detected by all sensors to control the three-way valve, the four-way valve and the solenoid valve to act in desired time sequence to obtain dryer compressed air.

DETAILED DESCRIPTION OF PREFERRED EMBODIMENTS

Figure 1:
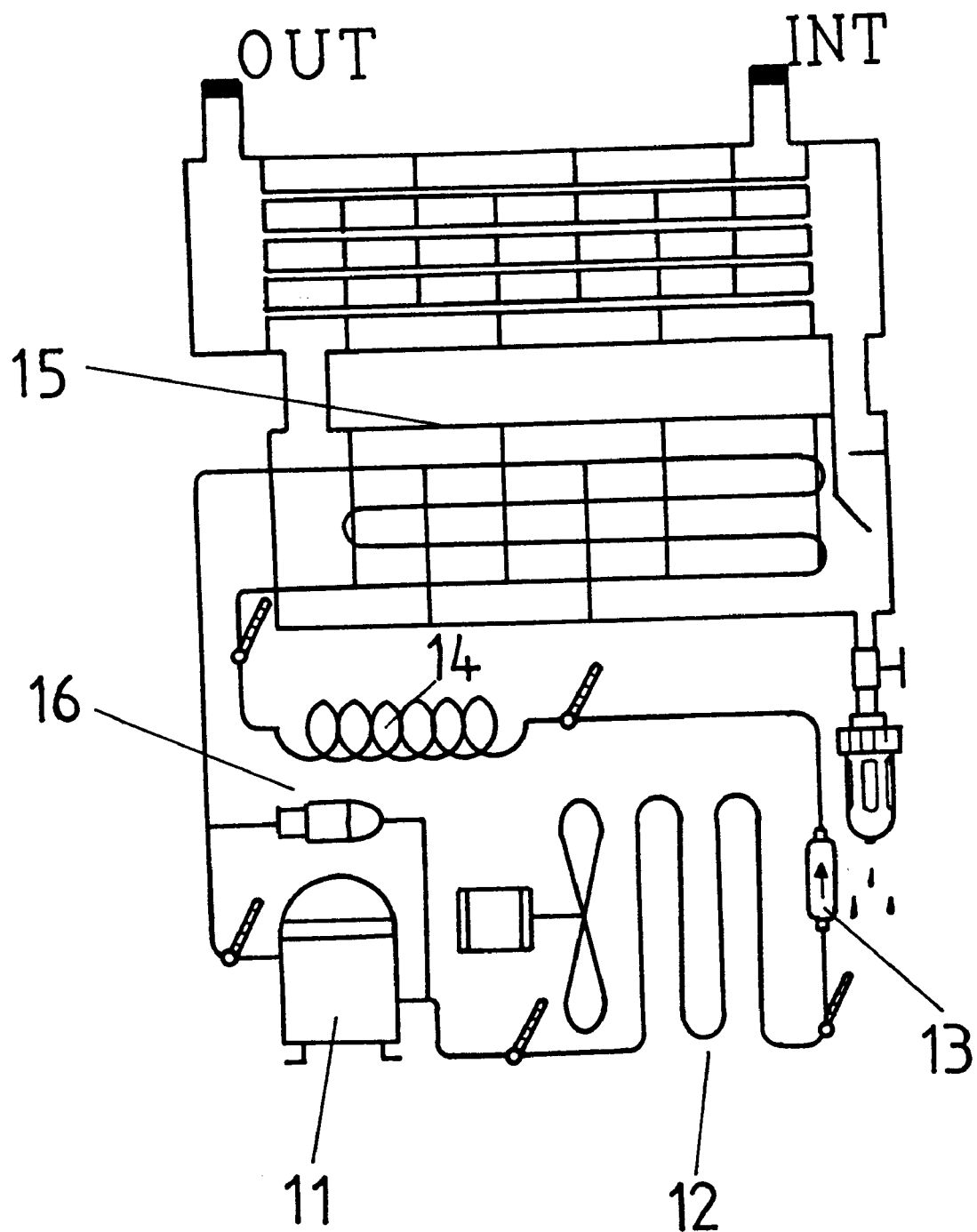
FIG. 1 is a schematic drawing of a conventional air-cooling dryer.
Figure 2:
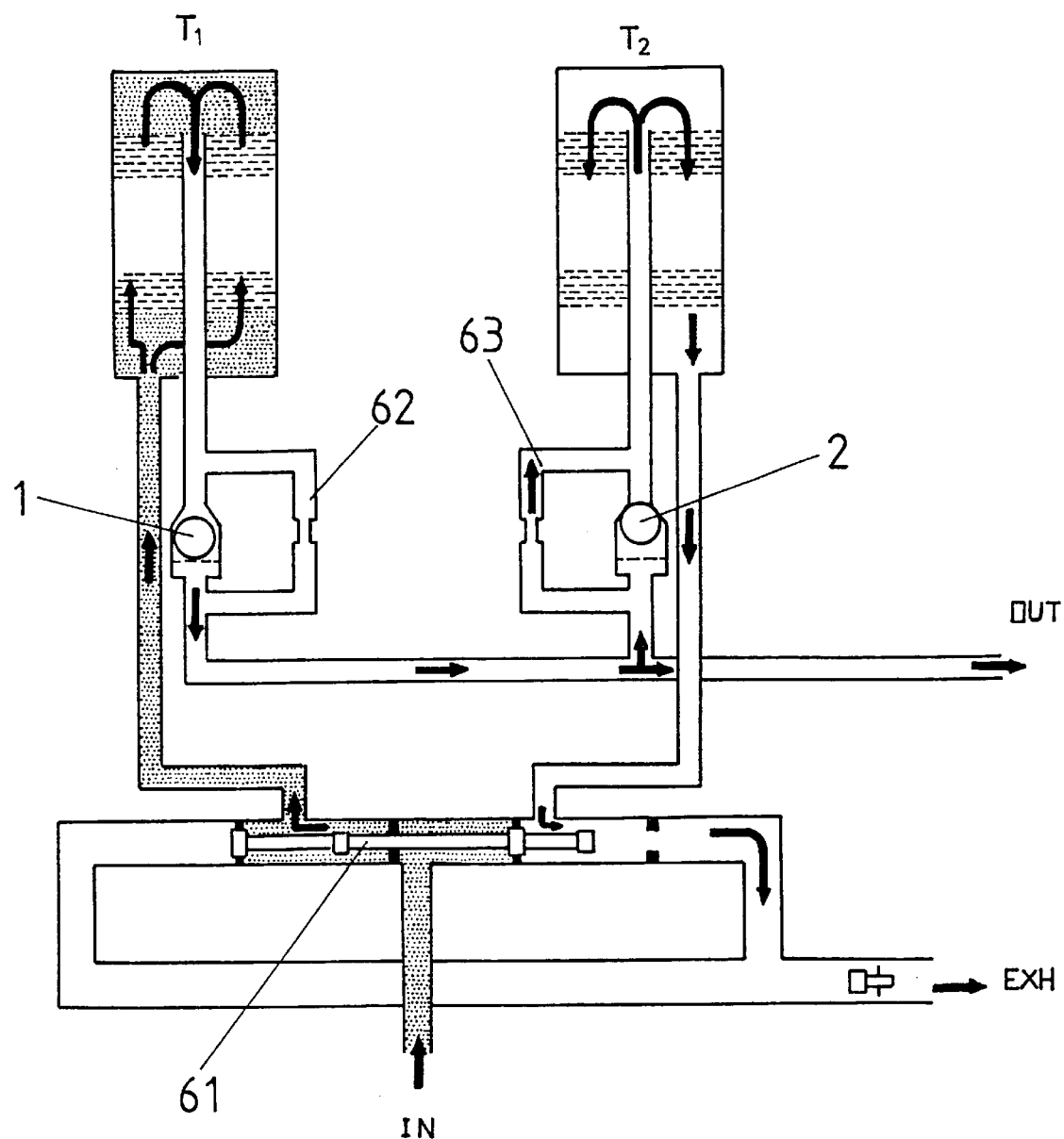
FIG. 2 is a schematic drawing of a conventional absorption dryer.
Figure 3:
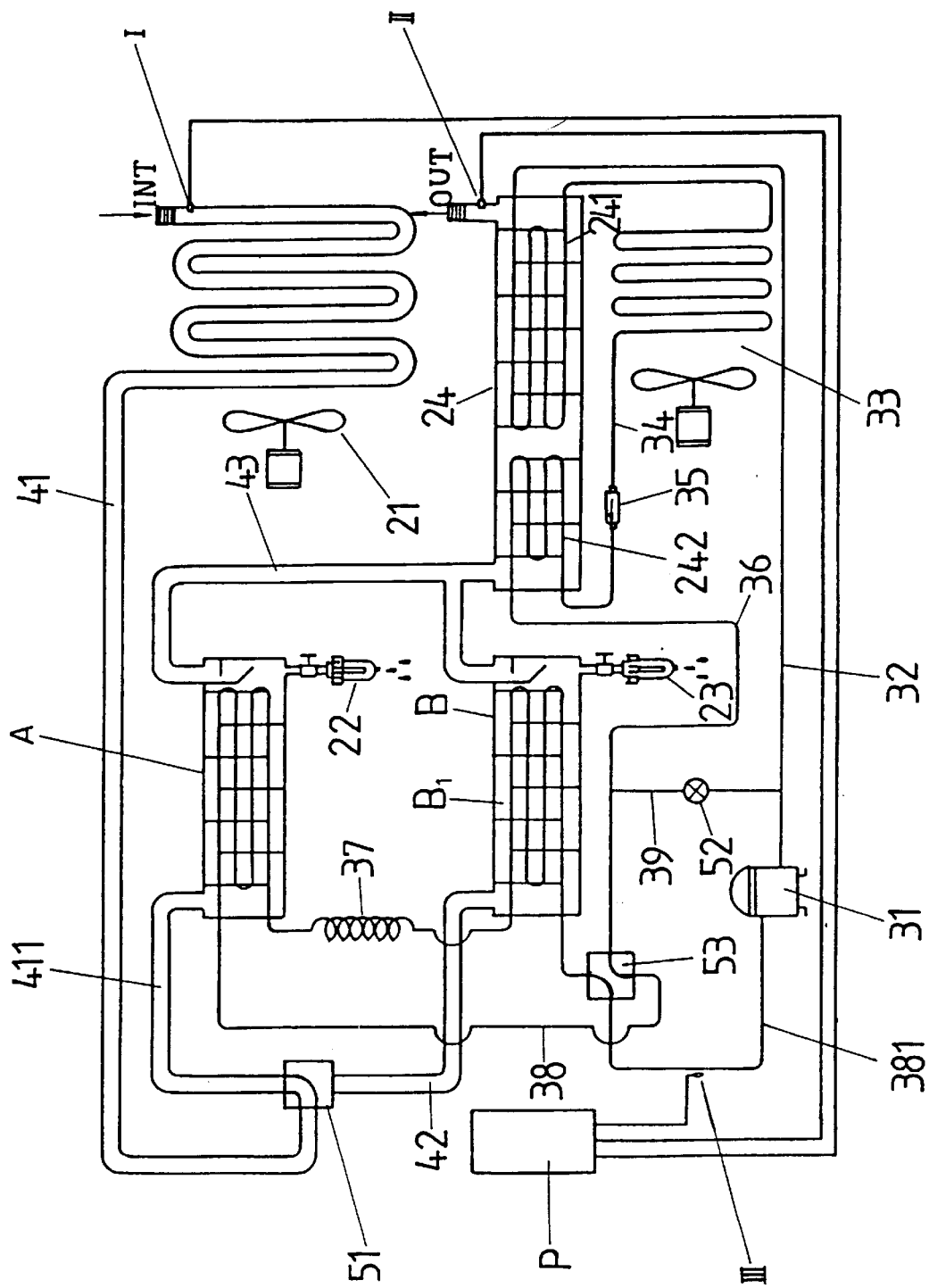
FIG. 3 is a schematic drawing of one cooling arrangement of the present invention.

Referring to FIG. 3, the present invention locates an air pre-cooler at the intake of an air pipeline 41. The other end of the air pipeline 41 connects to a three-way valve 51, in which the other two ports are connected to the air pipelines 411 and 42 of two evaporators A and B, respectively, to thereby control the orientations of the air current. Both evaporators A and B each have a respective individual automatic drainer 22, 23. Outlets of both evaporators A and B are coupled to a heat-exchanger 24, in parallel, by air pipelines 43 and 44. A cold-producing medium compressor 31 is connected to the heat-exchanger 24 via a cold-producing medium pipeline 32, and then through a cold pipeline 241, at the back end of the heat-exchanger 24, connected to a condenser 33. The outlet of condenser 33 is connected to a four-way valve 53 through the cold pipelines 242 and 36. The four-way valve connects to both evaporators A and B via cold-producing medium pipelines 38 and B1, respectively, and said both evaporators A and B are serially connected together by a capillary 37. One port of the four-way valve 53 connects to the cold-producing medium compressor 31 via a return conduit 381. The four-way valve together with a solenoid valve 52 that bridges between the cold-producing medium pipelines 32 and 36 with a pipeline 39, controls the direction of the cold-producing medium flow. On the other side, two pressure sensors I and II are respectively located on the air inlet of the air pre-cooler 21 and the air outlet of the heat-exchanger 24. A temperature sensor III is located on the return conduit 381. The pressure sensors I and II and the temperature sensor III are all connected to a microprocessor P, which controls the solenoid valve 52, the three-way valve 51 and four-way valve 53 responsive to the changes of the sensed temperature and pressures.

Continuing to refer to FIG. 3, the compressed air enters the pre-cooler 21 via the inlet for cooling to a normal temperature. The air pipe 41 carries the compressed air to the three-way valve 51, then via air pipe 411 passes into the evaporator A to be cooled and dried so as to be free of condensed water that is drained out by the automatic drainer 22. The cold dried compressed air is passed into the heat-exchanger 24 to absorb the heat given off by the high-pressure normal-temperature liquid and high-pressure high-temperature gaseous cold-producing medium, to form a normal-temperature dry compressed air output through the air outlet of the heat-exchanger 24.

In the cold-producing medium loop, the cold-producing medium compressor 31 pumps out a high-pressure high-temperature gaseous cold-producing medium through the cold-producing medium pipe 32 into the heat-exchanger 24. In heat-exchanger 24, the high pressure high-temperature gaseous cold-producing medium exchanges heat with the compressed air in order to output the normal-temperature dry compressed air. The cold-producing medium pipe 241 leads into the condenser 33 to give out heat, so that it is reduced to a high-pressure normal-temperature liquid cold-producing medium, which will be filtered to remove contaminants by a filter 35 cascaded in the cold-producing medium pipe 34. From filter 35 the high-pressure normal-temperature liquid cold-producing medium then enters the heat exchanger again through the cold-producing medium pipe 242 for increasing the overcooling temperature of the saturation liquid cold-producing medium. From the output of heat-exchanger 24, the pipe 36, via the four-way valve 53 leads the cold-producing medium into the evaporator B. By passing through the capillary 37, the cold-producing medium will be expanded and evaporated int the evaporator A, in which the cold-producing medium will absorb the heat of the compressed air to form a saturation gas. Finally, through the cold-producing medium pipe 38, the four-way valve 53 and the cold-producing medium pipe 381, the cold-producing medium will be returned to compressor 31 for recycling again.

Figure 4:
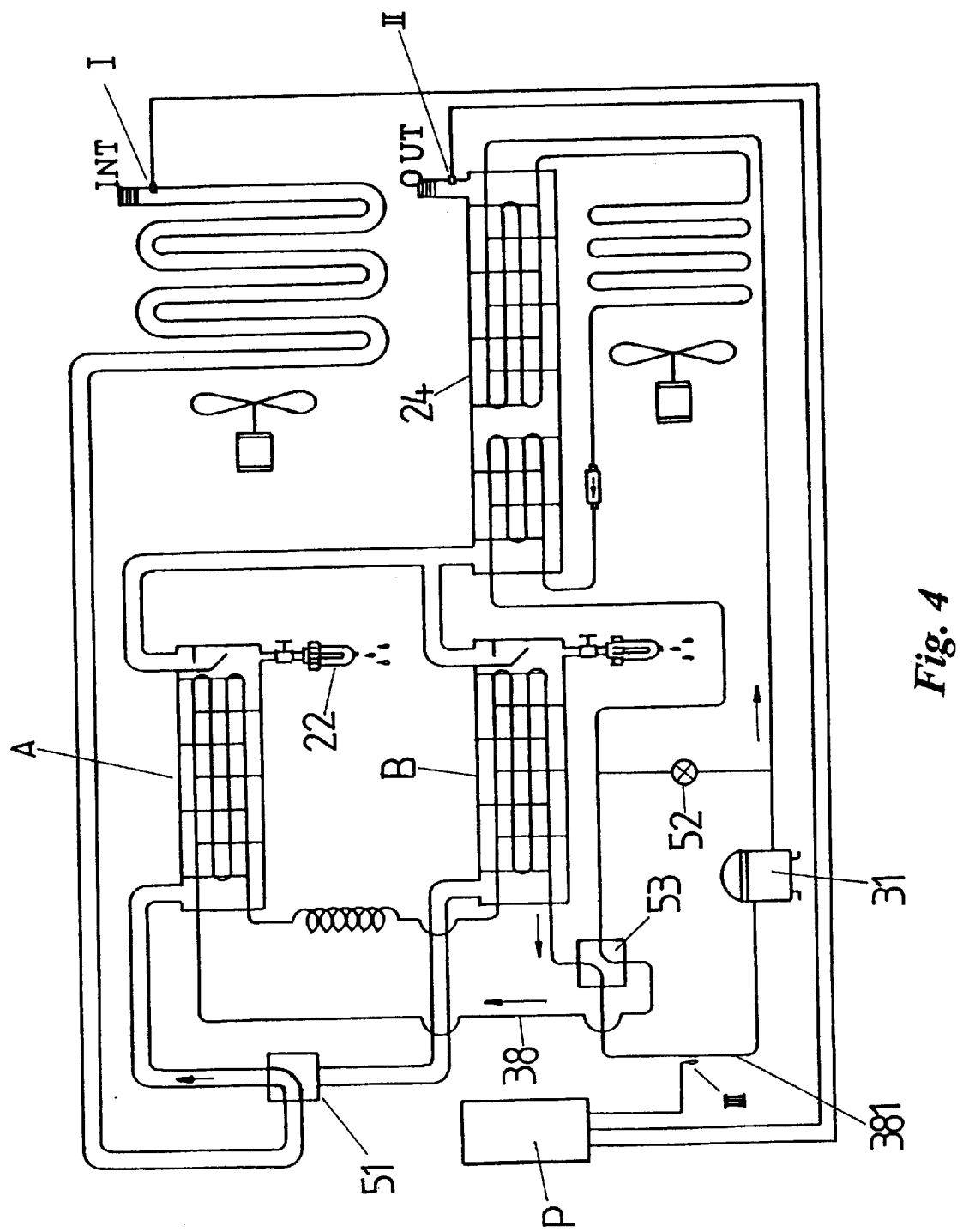
FIG. 4 is a schematic drawing of another cooling arrangement of the present invention.
Figure 5:
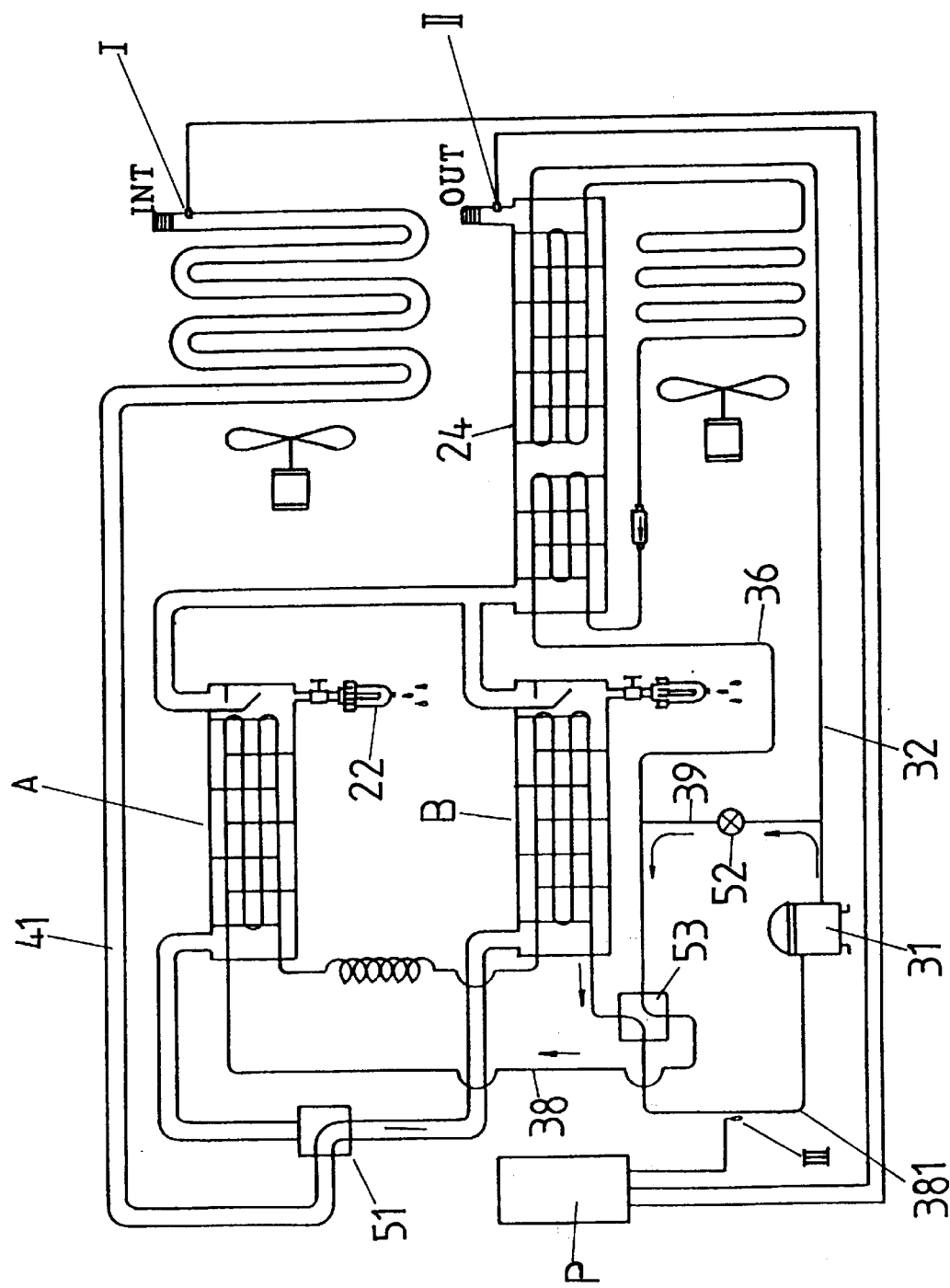
FIG. 5 is a schematic drawing of another cooling arrangement showing operation of the solenoid valve of the present invention; and, FIG. 6 is a schematic drawing of the cooling arrangement of FIG. 5 with the solenoid valve closed.
Figure 6:
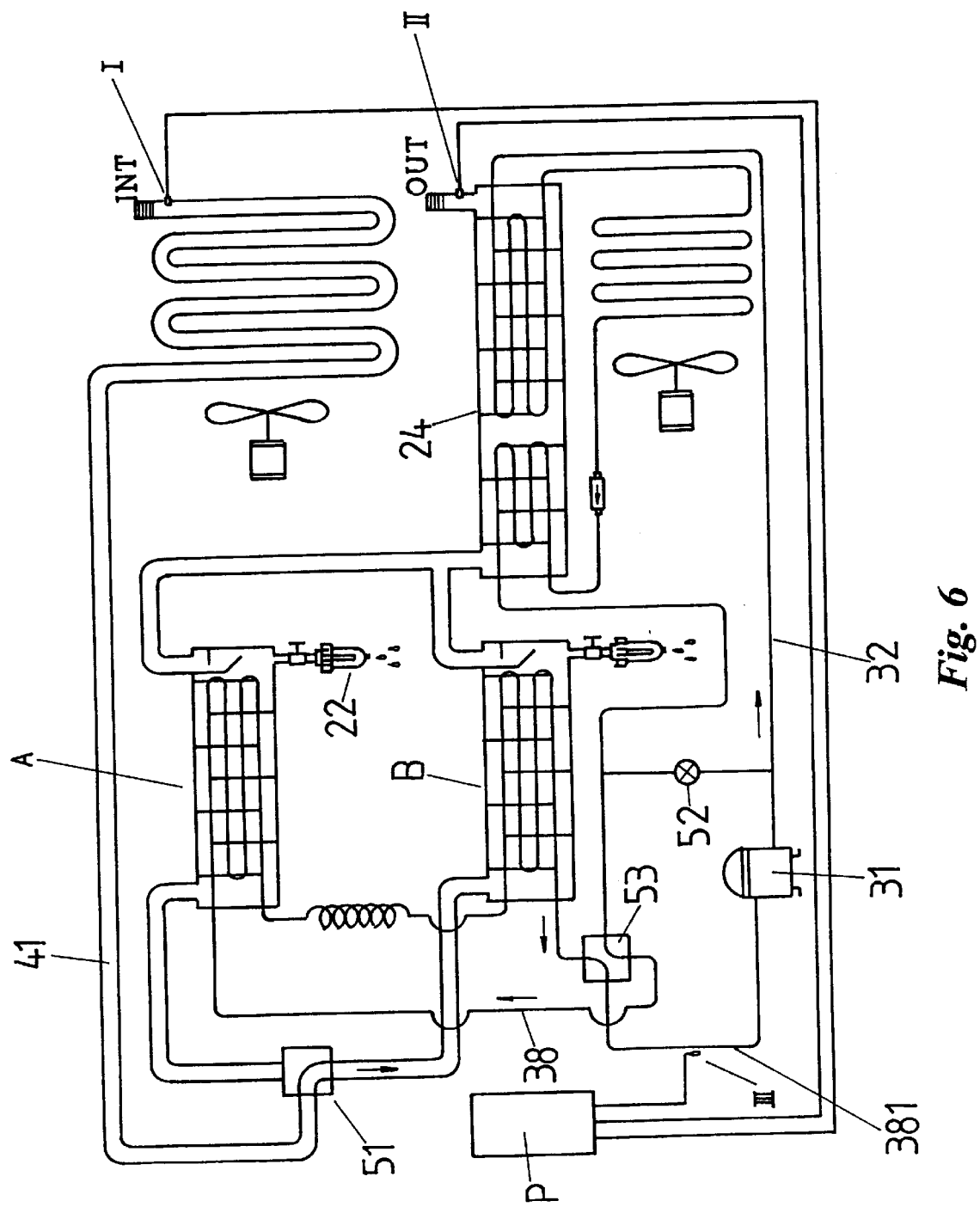

On the other side, the pressure sensors I and II respectively mounted to the air inlet and outlet, and the temperature sensor III located on the cold-producing medium pipe 381 detect the values of pressures and temperature, and feeds that data into the microprocessor P for comparing and calculating so that when the pressure difference between the air inlet and outlet gets to a certain value indicating the evaporate A has collected a certain amount of ice, the microprocessor P will trigger the four-way valve 53 to act to stop the evaporator A cooling. Meanwhile, the evaporator B will superseded it to cool (as shown in FIG. 4). When the compressed air passes through it, the drying effect will not be changed greatly, but because the temperature of the evaporator B has not decreased to the desired low, the temperature sensor III on the cold-producing medium pipe 381 will detect a higher value. The compressed air will pass through the evaporator A until the temperature of the evaporator B has decreased to the desired low. The microprocessor P will make the three-way valve 51 and the solenoid valve 52 act separately, to guide the compressed air and change the direction of flow into the evaporator B. Meanwhile, the high-pressure high-temperature gaseous cold-producing medium will be led into the evaporator A via the solenoid valve 52 and the four-way valve 53 to melt the accumulated ice rapidly. The ice water will be drained out by the automatic drainer 22 (as shown in FIG. 5). When the ice in the evaporator A has melted, the temperature of the returning cold-producing medium to the compressor 31 will go up slowly. The microprocessor P will shut off the solenoid valve 52 (as shown in FIG. 6). In this way, the microprocessor can control the three-way valve, four-way valve and the solenoid valve to act in a desired time sequence to make the evaporators A and B work alternately, so that the cooling dryer has the greatest effect, in order to obtain a high-quality dryer for compressed air.

I claim:

1. A dryer for compressed air, comprising:

a pre-cooler having a compressed air inlet and a compressed air pipeline extending from an outlet thereof;

a three-way valve coupled to said compressed air pipeline to selectively direct compressed air from said compressed air pipeline to one of a first outlet port and a second outlet port;

a pair of evaporators, a first of said pair of evaporators having an air inlet coupled to said first outlet port of said three-way valve, a second of said pair of evaporators having an air inlet coupled to said second outlet port of said three-way valve;

a heat exchanger having an air inlet coupled to an outlet of each of said pair of evaporators and a compressed air outlet;

a compressor having an outlet and a return line coupled to an inlet thereof;

a first pipeline fluidly coupling said outlet of said compressor to a refrigerant input of a first section of said heat exchanger;

a condenser having an inlet coupled to a refrigerant outlet of said heat exchanger first section;

a filter coupled in fluid communication with a outlet of said condenser;

a second pipeline fluidly coupling an outlet of said filter to a refrigerant inlet of a second section of said heat exchanger;

a third pipeline fluidly coupled to a refrigerant outlet of said second section of said heat exchanger;

a four-way valve having a first port fluidly coupled to said third pipe line, a second port coupled to said compressor return line, a third port fluidly coupled to a first refrigerant port of said first evaporator, and a fourth port coupled to a first refrigerant port of said second evaporator, said four-way valve selectively fluidly coupling said first port to one of said third and fourth ports and respectively coupling said second port to one of said fourth and third ports;

a capillary coupled between a second refrigerant port of said first evaporator and second refrigerant port of said second evaporator;

a solenoid valve coupled between said first pipeline and said third pipeline for bypassing refrigerant therebetween;

a pair of pressure sensors respectively coupled to said compressed air inlet of said pre-cooler and said compressed air outlet of said heat exchanger;

a temperature sensor coupled to said compressor return line; and, a processor having inputs respectively coupled to said pair of pressure sensors and said temperature sensor, said processor having outputs respectively coupled to said three-way valve, said four-way valve, and said solenoid valve for sequential control thereof responsive to signals from said pair of pressure sensors and said temperature sensor.

2. The dryer for compressed air as recited in claim 1 where each of said first and second evaporators includes an automatic drain valve for removing condensed water therefrom.

* * * * *